United States Patent [19]

Ogura

[11] Patent Number: 4,510,422
[45] Date of Patent: Apr. 9, 1985

[54] DC MOTOR SOFT-START CIRCUIT

[75] Inventor: Masahiko Ogura, Fujisawa, Japan

[73] Assignee: Tokyo Shibaura Denki Kabushiki Kaisha, Kawasaki, Japan

[21] Appl. No.: 577,337

[22] Filed: Feb. 6, 1984

[30] Foreign Application Priority Data

Feb. 9, 1983 [JP]  Japan .................................. 58-20106

[51] Int. Cl.³ ............................................. H02P 1/18
[52] U.S. Cl. ..................................... 318/254; 363/49
[58] Field of Search .................... 318/254, 254 A, 138, 318/439; 363/49

[56] References Cited

U.S. PATENT DOCUMENTS

| | | | |
|---|---|---|---|
| 3,475,674 | 10/1969 | Porterfield et al. | 363/49 X |
| 3,879,647 | 4/1975 | Hamilton et al. | 363/49 X |
| 4,233,557 | 11/1980 | Alberkrack | 363/49 X |
| 4,236,198 | 11/1980 | Ohsawa et al. | 363/49 |
| 4,251,757 | 2/1981 | Akamatsu | 318/83 |
| 4,356,437 | 10/1982 | Saito et al. | 318/439 X |

FOREIGN PATENT DOCUMENTS

| | | | |
|---|---|---|---|
| 52-64714 | 5/1977 | Japan | 363/49 |
| 54-126922 | 10/1979 | Japan | 363/49 |
| 55-53182 | 4/1980 | Japan | 363/49 |
| 57-80263 | 5/1982 | Japan | 363/49 |
| 57-132762 | 8/1982 | Japan | 363/49 |

Primary Examiner—Stanley J. Witkowski
Assistant Examiner—Bentsu Ro
Attorney, Agent, or Firm—Cushman, Darby and Cushman

[57] ABSTRACT

A DC motor driving circuit includes an exciting coil switching circuit for selecting from among polyphase exciting coils of a brushless motor those coils to be excited and their excitation directions. An excitation current control transistor is connected between a DC excitation current supply line and a DC power supply. A timing signal producing circuit including a time constant circuit is produced so as to limit starting current at the time of starting of the motor. The excitation current control transistor is controlled by the timing signal at the time of starting of the motor.

4 Claims, 15 Drawing Figures

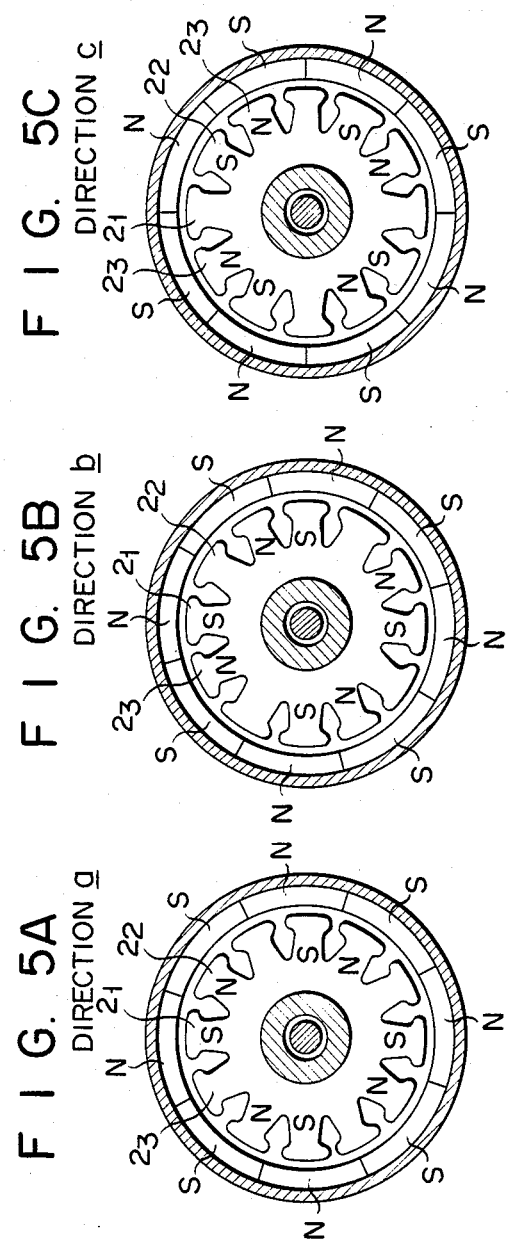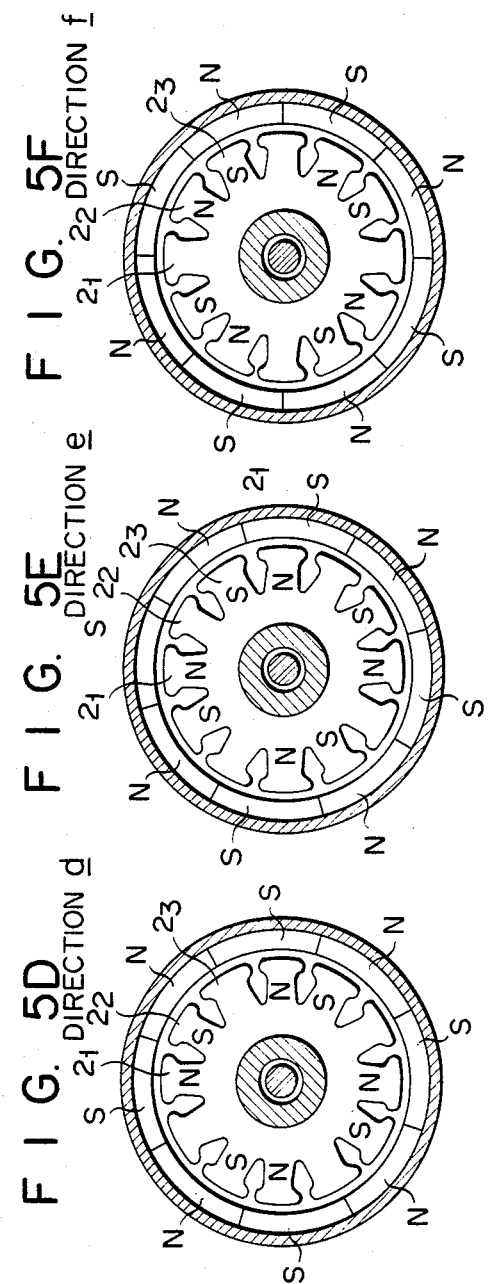

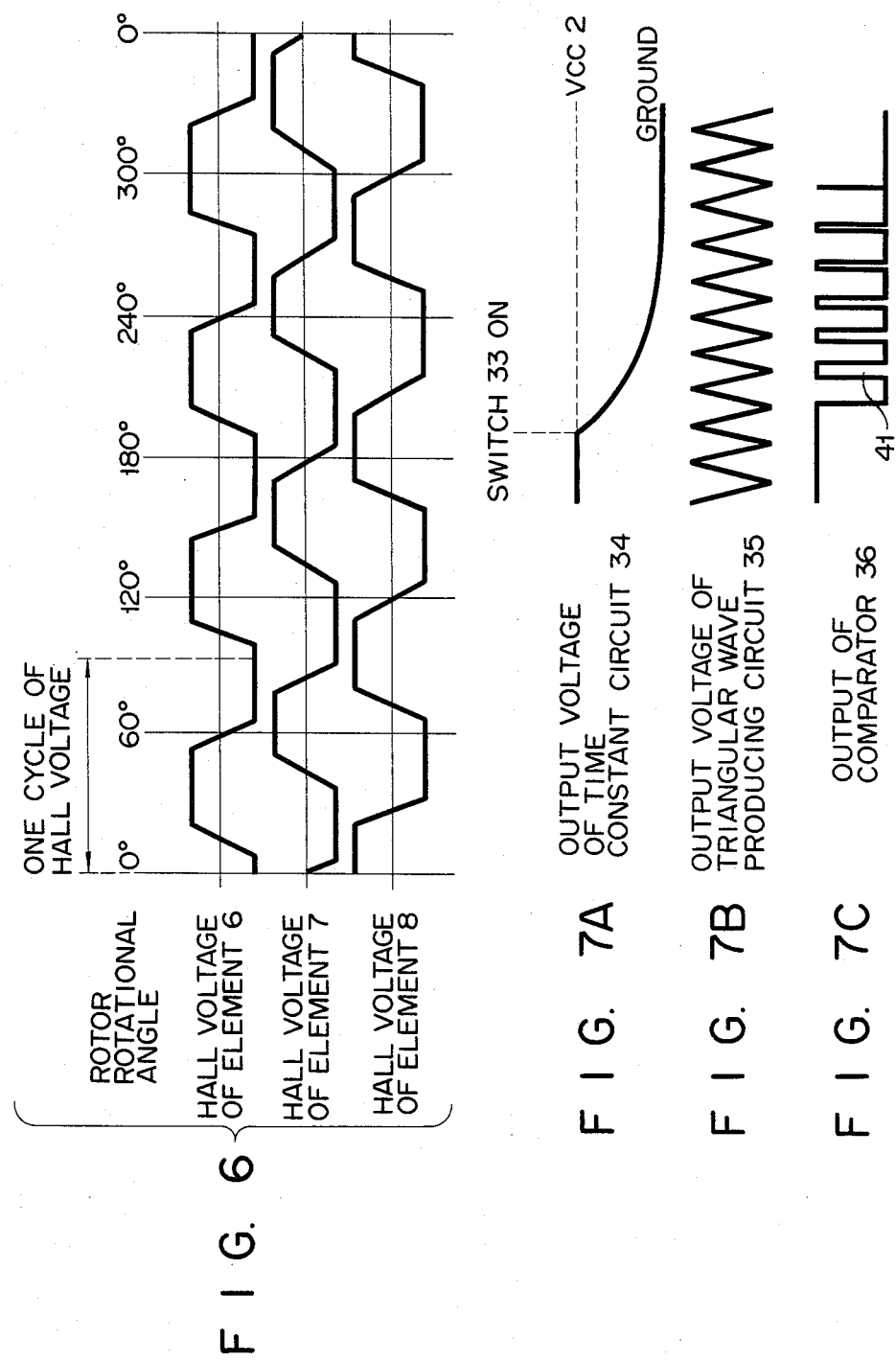

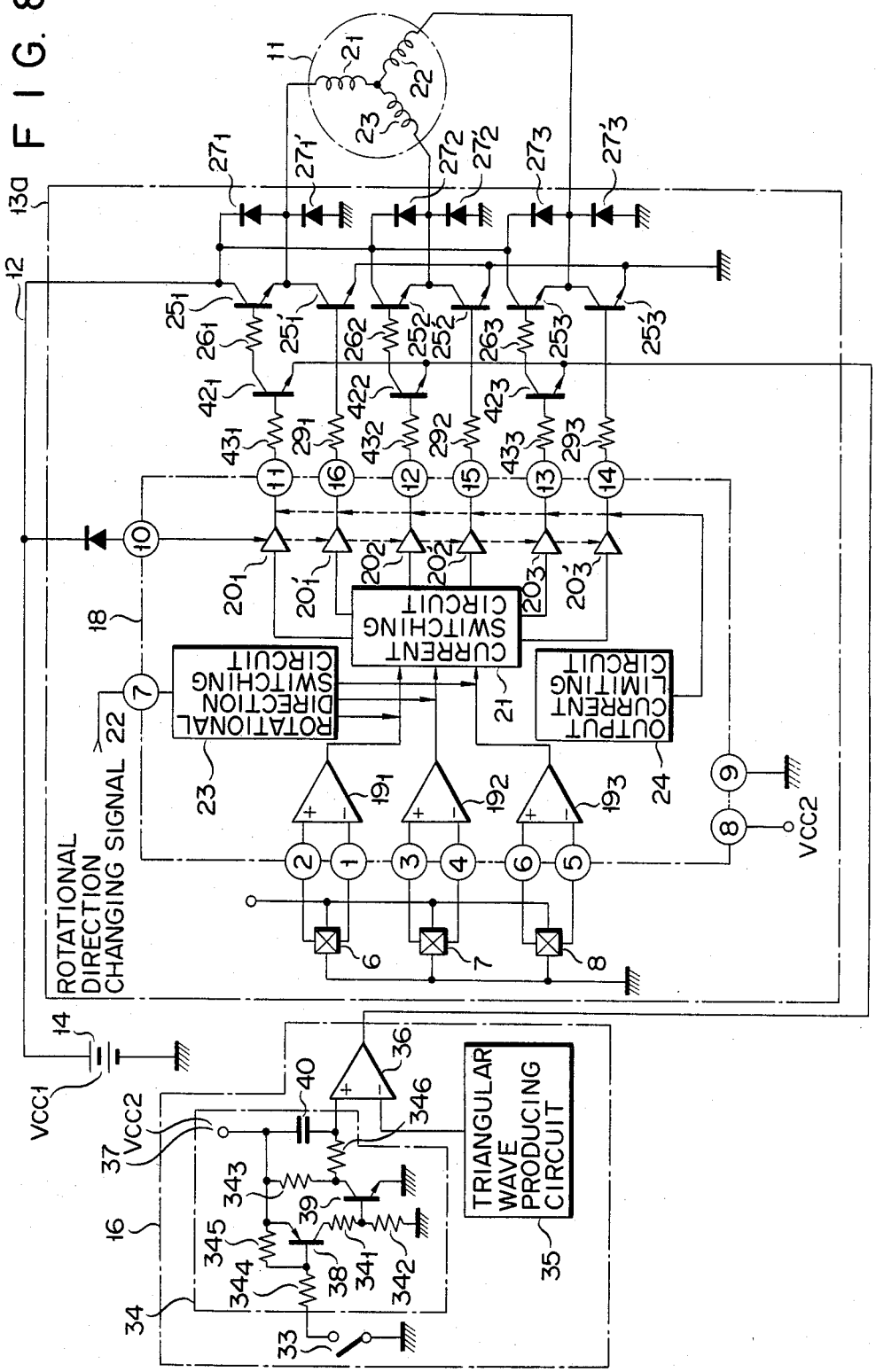

DC MOTOR SOFT-START CIRCUIT

BACKGROUND OF THE INVENTION

This invention relates to a driving circuit for a DC motor including a brushless motor and a motor with a brush.

For example, a brushless IC motor and a motor with a brush are widely used as a DC motor. The brushless IC motor is driven by detecting the position of a rotor by hall elements and controlling switching transistors by the detected signals and thus sequentially switching stator coils to be excited. A motor with a brush is adapted to switch excitation currents into rotor coils according to the state of electric contacting between the brush and the commutators.

In this motor with a brush, DC voltage continues to be supplied to an exciting coil during a period of time required from the contacting of the brush with one commutator to the contacting of the brush with the next commutator. Therefore, a period of time for the DC voltage with a brush to be supplied to one exciting coil during the rotation of the rotor is very short. Further, during this short period of time, the exciting current does not adequately rise due to the presence of an inductance of the exciting coil. Still further, a counter electromotive force is generated in the exciting coil according to the rotation of the rotor, in which case only a part of voltage of a DC power source is applied between both the terminals of the exciting coils because of that the counter electromotive force is subtracted from the voltage applied across the terminals of the exciting coil. As a result, a smaller current flows through the exciting coil. If a greater driving force is required, it is necessary that the voltage to be applied across the exciting coil be set at a higher level. Since at the time of starting of the motor the rotor is at rest, voltage is applied across the exciting coil for a prolonged period of time and no counter electromotive force is generated in the exciting coil. If, at such a state, a higher voltage is applied across the coil, an excessive current flows through the exciting coil at the time of starting of the motor, causing a possible damage to a driving circuit and power supply circuit.

As the brushless IC motor, use is often made of three-phase brushless motor. In such three-phase brushless motor, one exciting coil is excited during a one-third cycle period and thus a voltage is applied across the exciting coil during a long period compared with that of the motor with the brush. If, therefore, excessive current flows across the exciting coil at the time of starting of the motor, the driving circuit and power supply circuit are liable to be damaged.

SUMMARY OF THE INVENTION

It is accordingly the object of this invention to provide a DC motor driving circuit which can be prevented from being damaged by suppressing currents flowing through exciting coils at a time of starting of the DC motor to less than a predetermined level.

A DC motor driving circuit of this invention comprises a motor having polyphase exciting coils, a DC power supply, an excitation current supply line for supplying excitation current from the DC power supply to the polyphase exciting coils, exciting coil switching means connected to the excitation current supply line and the polyphase exciting coils, for sequentially switching the polyphase coils, excitation current control means for controlling the magnitude of the excitation currents to be supplied to the exciting coils, and timing signal producing means for producing a timing signal which, when the motor is started, is supplied to the excitation current control means so as to suppress the magnitude of the excitation current.

BRIEF DESCRIPTION OF THE DRAWINGS

This invention will be described below with reference to the accompanying drawing sheets.

FIGS. 5A to 5F show a positional relation between the rotor and the stator;

FIG. 6 is a waveform diagram showing output voltages of hall elements on the stator;

FIGS. 7A to 7C show a waveform diagram showing each part of a timing signal producing circuit in FIG. 1; and FIG. 8 is a circuit diagram showing a DC motor driving circuit according to another embodiment of this invention.

DETAILED DESCRIPTION OF THE PREFERRED EMBODIMENTS

Figure 1:
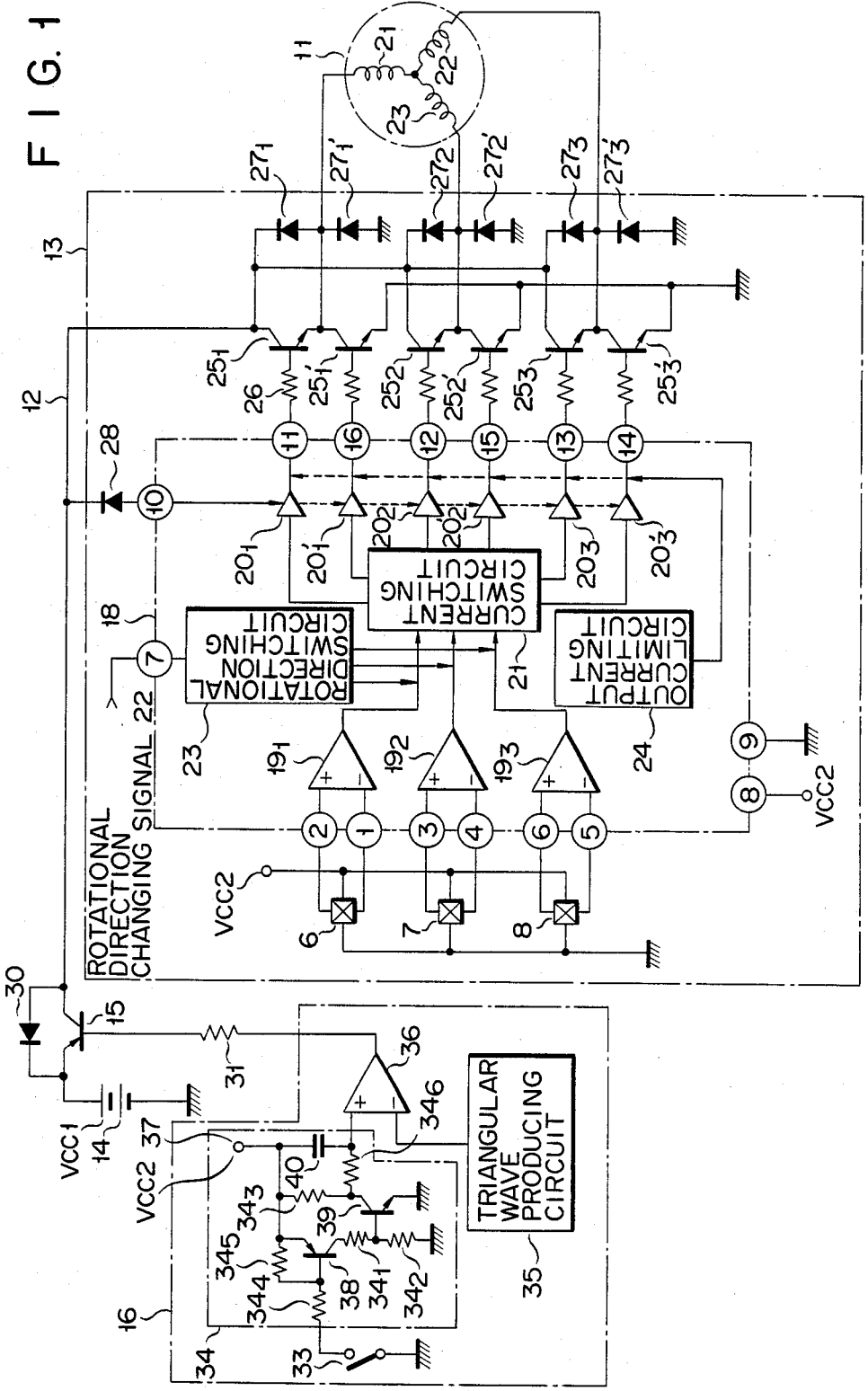
FIG. 1 is a circuit diagram showing a DC motor driving circuit according to one embodiment of this invention.

In FIG. 1, a DC motor driving circuit comprises a brushless motor 11, an excitation current supply line 12 for supplying excitation current to exciting coils of the motor, an exciting coil switching circuit 13, a DC power supply 14, a transistor 15 connected between the DC power supply 14 and the excitation current supply line 12 to control the magnitude of current which is supplied to the excitation current supply line 12, and a timing signal producing circuit 16 adapted to produce a timing signal for controlling the transistor 15 so as to permit the excitation current which is supplied to the exciting coils to be increased at a predetermined speed when the motor 11 is started.

Figure 2:
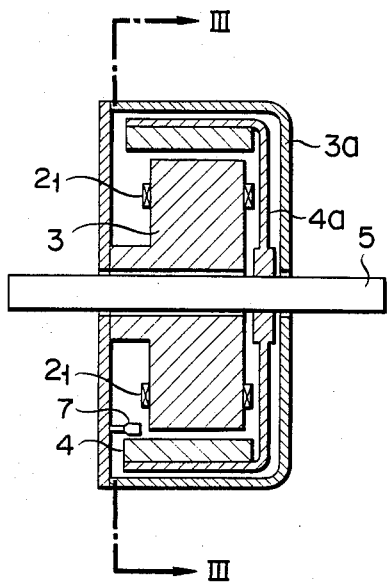
FIG. 2 is a cross-sectional view showing the brushless motor in FIG. 1.
Figure 3:
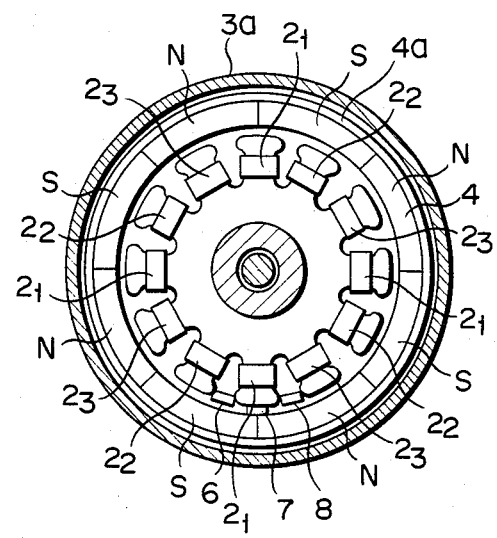
FIG. 3 is a cross-sectional view, taken along line III—III in FIG. 2, showing the brushless motor in FIG. 1.

The brushless motor 11 includes Y-connected three-phase exciting coils $2_1, 2_2, 2_3$. As shown in FIGS. 2 and 3, a stator 3 is fixed within a supporting casing 3a and has twelve poles arranged in a radial pattern around the outer periphery of the stator 3. The exciting coils $2_1, 2_2, 2_3$ are wound around the corresponding poles as shown in FIG. 3. In a spacing between the stator 3 and the supporting casing 3a, a group of rotor poles (hereinafter referred to as a rotor) 4 is provided which is comprised of a permanent magnet having eight poles, i.e. alternating N and S poles, and is arranged, in a ring-like fashion, in opposition to the twelve poles. The rotor 4 is fixed to a rotating member 4a. A rotating shaft 5 is fixed to the rotating member 4a, and is rotatably supported by the supporting casing 3a at its right and left ends and by the stator 3. Hall elements 6, 7, 8 are secured to the supporting casing 3a so as to detect the position of the rotor 4. The hall elements 6, 8 are located at the corresponding adjacent slots of the stator 3 and the hall element 7 is located intermediate between the hall elements 6, 8.

Figure 4:
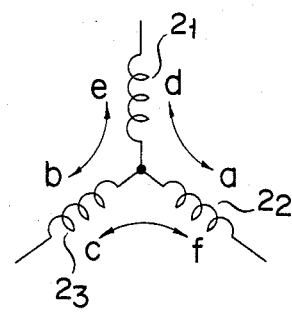
FIG. 4 is a connection of exciting coils wound about the stator in FIG. 3.

FIGS. 5A to 5F show positional relations between the rotor 4 and the stator 3 at the time when the exciting coils $2_1$, $2_2$, $2_3$ are selectively excited in the directions a, b, c, d, e, f as shown in FIG. 4. The exciting coils $2_1$, $2_2$, $2_3$ are excited in a combination of two of a, b, c, d, e, f as shown in FIG. 4, noting that a, b, c, d, e, f show the exciting directions. In any of FIGS. 5A to 5F, the rotor 4 is clockwise rotated, by a spacing corresponding to one slot, under a mutual function of a magnetic field created by the excitation of the coils $2_1$, $2_2$, $2_3$ and a magnetic field created by the rotor 4. With a step of FIG. 5A as a reference, the rotor 4 is clockwise rotated through a mechanical angle of 90° as will be appreciated from a step of FIG. 5F. If the exciting coils $2_1$, $2_2$, $2_3$ are excited in an order of the steps of FIGS. 5F to 5A, the rotor 4 will be rotated in a reverse direction.

As explained in connection with FIGS. 5A to 5F, the output voltages (AC voltages) of the hall elements 6 to 8 when the rotor is clockwise rotated are as shown in FIG. 6. That is, since the rotor 4 is rotated through an angle of 90° with respect to one cycle of hall voltage, it follows that the rotor makes one complete rotation for every four cycles of the hall voltage. The excitation switching of the exciting coils $2_1$, $2_2$, $2_3$ are effected by detecting output voltages of the hall elements 6, 7, 8. That is, if the output voltages (hall voltages) of the hall elements 6, 7, 8 are "−", "0", "+", respectively, upon clockwise rotation of the rotor 4, the rotor 4 is set at a position shown in FIG. 5F. Supposing that at this time, the excitation of the exciting coils $2_1$, $2_2$ is changed in the direction of a in FIG. 4, the rotor 4 is clockwise rotated through an angle of 15°, and is set at a position equivalent to the position shown in FIG. 5A. When, however, the rotor 4 is set to the position equivalent to the position of FIG. 5A, the hall voltages of the hall elements 6, 7, 8 are changed to "0", "−", "+" and the exciting coils $2_1$, $2_3$ are switched in a direction of b in FIG. 4 and thus the rotor 4 is further clockwise rotated through an angle of 15° and is set to a position equivalent to the position of FIG. 5B. If, in this way, the coils to be excited and their excitation directions are sequentially switched according to the hall voltages, the rotor 4 can be continuously rotated in the clockwise direction.

Mutual relation among a rotor position with respect to the stator (the rotor position is denoted by an angle starting from a reference position of 0°), polarities of the hall voltages, and coils to be excited and their excitation direction in the following step, is shown in the following table. In the table, the coils to be excited and their excitation directions are denoted in two cases where the rotor is rotated clockwise and counterclockwise.

TABLE

| | Hall Voltages at the Rotor Position | | | Following Exciting Coils and Exciting Direction (FIG. 4) | |
|---|---|---|---|---|---|
| Rotor Position | Hall Element 6 | Hall Element 7 | Hall Element 8 | For Clockwise Direction | For Counter-clockwise Direction |
| 0° | − | 0 | + | a | e |
| 15° | 0 | − | + | b | f |
| 30° | + | − | 0 | c | a |
| 45° | + | 0 | − | d | b |
| 60° | 0 | + | − | e | c |
| 75° | − | + | 0 | f | d |

The above-mentioned exciting coil switching circuit 13 can be comprised mainly of a known semiconductor integrated circuit [for example, μPC1246C (trade name) of Nippon Electric Company Limited]—hereinafter referred to as an IC—for the drive of a DC brushless motor. That is, IC 18 comprises, as shown in FIG. 1, a comparator $19_1$ connected to input terminals ②, ① thereof; a comparator $19_2$ connected to input terminals ③, ④ thereof; a comparator $19_3$ connected to input terminals ⑥, ⑤ thereof; predrivers $20_1$, $20'_1$, $20_2$, $20'_2$, $20_3$, $20'_3$ whose output terminals are connected to terminals ⑪, ⑯, ⑫, ⑬, ⑭ thereof; a current switching circuit 21 for receiving the outputs of the comparators $19_1$, $19_2$, $19_3$ to provide outputs to the predrivers $20_1$, $20'_1$, $20_2$, $20'_2$, $20_3$, $20'_3$; a rotational direction switching circuit 23 adapted to process a rotational direction changing signal 22 of the rotor which is supplied through the terminal ⑦ thereof and supply output signals to corresponding input terminals of the current switching circuit 21; and an output current limiting circuit 24 for limiting the output currents of the predrivers. A terminal ⑩ of IC 18 is connected to the respective predrivers; a terminal ⑧ thereof is connected to a power supply terminal $V_{CC2}$ and a terminal ⑨ thereof is connected to ground.

The hall elements 6, 7, 8 are connected between the power supply terminal $V_{CC2}$ and ground and the outputs thereof are supplied to the terminals ②, ①; ③, ④; ⑥, ⑤. Under a mutual function between currents flowing through the hall elements from the power supply terminal $V_{CC2}$ and a magnetic flux crossing the hall elements, hall voltages as shown in FIG. 6 are produced and power transistors as set out hereinafter are controlled by supplying the hall voltages thereto through the predrivers.

Between the excitation current supply line 12 and ground are connected a series circuit of the emitter-collector paths of the power transistors $25_1$, $25'_1$, series circuit of the emitter-collector paths of the power transistors $25_2$, $25'_2$ and series circuit of the emitter-collector paths of the power transistors $25_3$, $25'_3$. The power transistors $25_1$, $25'_1$, $25_2$, $25'_2$, $25_3$, $25'_3$ are connected, at their base electrodes, to the corresponding output terminals of IC 18, respectively through input resistors 26. The power transistor $25_1$ is connected, at its emitter, to the coil $2_1$, the power transistor $25_2$, at its emitter, to the coil $2_3$ and the power transistor $25_3$, at its emitter, to the coil $2_2$. In this connection, it is to be noted that in order to discharge a voltage, corresponding to the counter electromotive force, produced from the coils $2_1$, $2_2$, $2_3$, diodes $27_1$, $27'_1$, $27_2$, $27'_2$, $27_3$ and $27'_3$ are connected with their polarities indicated in FIG. 1. The terminal ⑩ of IC 18 is connected to the excitation current supply line 12 through a diode 28 having its polarities indicated in FIG. 1. The circuit including IC 18 and various parts connected thereto is hereinafter referred to as the exciting current switching circuit 13.

A current control transistor 15 of a PNP type is connected between the positive terminal of the DC power supply 14 and the excitation current supply line 12. Between the collector and the emitter of the transistor 15, a diode 30 is connected with its polarities indicated in FIG. 1. An output signal of the timing signal producing circuit 16 is connected through a resistor 31 to the base electrode of the transistor 15.

The timing signal producing circuit 16 includes a switch 33 adapted to be turned ON at the time of starting of the motor 11, a time constant circuit 34 for producing a signal which is dropped from a predetermined level $V_{CC2}$ to ground level during a predetermined period of time following the turning ON of the start switch 33, a triangular wave producing circuit 35, and a comparator 36 connected to receive at its noninverting terminal (+) an output of the time constant circuit 34 and at its inverting terminal (−) an output of the triangular wave producing circuit 35 to produce a timing pulse signal to be supplied to the base electrode of the control transistor 15.

The time constant circuit 34 includes a PNP transistor 38 whose emitter-collector path is connected between ground and the terminal 37 supplied with the power supply potential $V_{CC2}$, through resistors $34_1$, $34_2$; an NPN transistor 39 connected between the terminal 37 and ground through a resistor $34_3$; a resistor $34_4$ connected between the start switch 33 and the base electrode of the transistor 38; a resistor $34_5$ connecting the emitter and base electrode of the transistor 38; a resistor $34_6$ connected between the collector of the transistor 39 and the noninverting terminal (+) of the comparator 36; and a capacitor 40 connected between the noninverting terminal (+) of the comparator and the power supply terminal 37.

The DC motor driving circuit as shown in FIG. 1 is operated as follows: When the start switch 33 for starting the motor 11 is turned ON, the transistor 38 is turned ON and thus a base current flows through the terminal 37, transistor 38 and resistor $34_1$ into the transistor 39 to cause the transistor 39 to be turned ON. As a result, a potential on the noninverting input terminal (+) of the comparator 36 is gradually lowered from the potential level $V_{CC2}$ on the terminal 37 to the ground level according to a time constant of the capacitor 40 and resistor $34_6$. On the other hand, the triangular wave producing circuit 35 supplies a triangular wave as shown in FIG. 7B to the inverting input terminal (−) of the comparator 36 to produce a comparator output as shown in FIG. 7C. As will be appreciated from FIG. 7C, a timing pulse 41 becomes gradually narrower in width and, when an output (FIG. 7A) of the time constant circuit 34 reaches a ground level, the output of the comparator 36 becomes a ground level. Since the turning ON and OFF of the transistor 15 is controlled by the timing pulses as shown in FIG. 7C, a total excitation current which is supplied to the excitation current supply line 12 through the transistor 15 is gradually increased from a point of time at which the start switch 33 is turned ON and, after a lapse of a predetermined time, maintained at a constant level. Where, for example, the motor 11 is driven in a clockwise direction, the transistors $25_1$, $25'_3$ are turned ON and the transistors $25'_1$, $25_2$, $25'_2$, $25_3$ are turned OFF. At this time, the excitation current flows through a loop which is established from the power supply 14 through the transistor 15, excitation current supply line 12, transistor $25_1$, coils $2_1$, $2_2$ and transistor $25'_3$ to ground. Since, in this way, the coils $2_1$, $2_2$ are excited, the motor 11 is started. When the transistors $25_1$, $25'_2$ are turned ON by the outputs of IC 18 and the transistors $25'_1$, $25_2$, $25_3$, $25'_3$ are turned OFF, then the coils $2_1$, $2_3$ are excited. Thus, the motor 11 can be started in a predetermined rotational direction by effecting the excitation switching of the exciting coils as explained in connection with FIGS. 5A to 5F. Since, as shown above, the excessive current can be decreased at the time of starting of the motor, it is possible to prevent a damage of the driving circuit due to the excessive starting current. It is evident that, if it is necessary to effect the speed control of the motor 11 at a normal operation time, it is necessary only to change the degree of conduction of the transistor 15 by means not shown.

In an embodiment as shown in FIG. 8, an excitation current control means is incorporated in the exciting current switching circuit 13a. An excitation current supply line 12 is connected directly to the power supply 14. In FIG. 8, excitation current control transistors $42_1$, $42_2$, $42_3$ of an NPN type are connected at their collectors to the base electrodes of transistors $25_1$, $25_2$, $25_3$ respectively through base resistors $26_1$, $26_2$, $26_3$ and at their emitters to the output terminal of the comparator 36 in the timing signal producing circuit 16. The base electrodes of the transistors $42_1$, $42_2$, $42_3$ are connected to terminals ⑪, ⑫, ⑬ of IC 18 respectively through base resistors $43_1$, $43_2$, $43_3$. In this arrangement, pulses on the emitters of the transistors $42_1$, $42_2$, $42_3$ reach an "H" level during the "H" level of the pulse 41 shown in FIG. 7C. Even if the outputs of predrivers $20_1$, $20_2$, $20_3$ reach an "H" level, the transistors $42_1$, $42_2$, $42_3$ are held at an OFF state. It is therefore possible to decrease any excessive current, as in the arrangement shown in FIG. 1, at the time of starting of the motor 11.

Although the brushless motor has been explained in connection with the respective embodiments, this invention can also be applied to a motor with a brush. In this case, the hall elements 6, 7, 8 and power transistors $25_1$, $25'_1$, $25_2$, $25'_2$, $25_3$, $25'_3$ can be omitted.

What is claimed is:

1. A DC motor driving circuit comprising:
    a motor having polyphase exciting coils;
    a DC power supply;
    an excitation current supply line for supplying excitation current from the DC power supply to the polyphase exciting coils;
    exciting coil switching means connected to the excitation current supply line and the polyphase exciting coils, for sequentially switching the polyphase exciting coils;
    excitation current control means for controlling the magnitude of the excitation currents to be supplied to the exciting coils; and
    timing signal producing means for producing a timing signal which, when the motor is started, is supplied to the excitation current control means so as to suppress the magnitude of the excitation current, said timing signal producing means including a start switch adapted to be turned ON when the motor is started; a time constant circuit for producing a signal which is lowered from a predetermined level to a ground level during a predetermined period of time following the turning on of the start switch; a triangular wave producing circuit; and a comparator connected to receive an output signal of the time constant circuit and an output signal of the triangular wave producing circuit and supply pulses which successively decrease in their widths, to the excitation current control means.

2. A DC motor driving circuit according to claim 1, in which said excitation current control means includes a semiconductor switch which is connected between the DC power supply and the excitation current supply line and controlled by an output signal of the timing signal producing means.

3. A DC motor driving circuit according to claim 1, in which said excitation current control means includes a plurality of transistors which constitute part of said exciting coil switching means.

4. A DC motor driving circuit according to claim 1, in which said motor is a brushless motor.

* * * * *